Nov. 15, 1960  F. W. McDONALD  2,959,940
APPARATUS FOR INDIVIDUAL REFRIGERATION OF GLASS VESSELS
Filed June 19, 1957
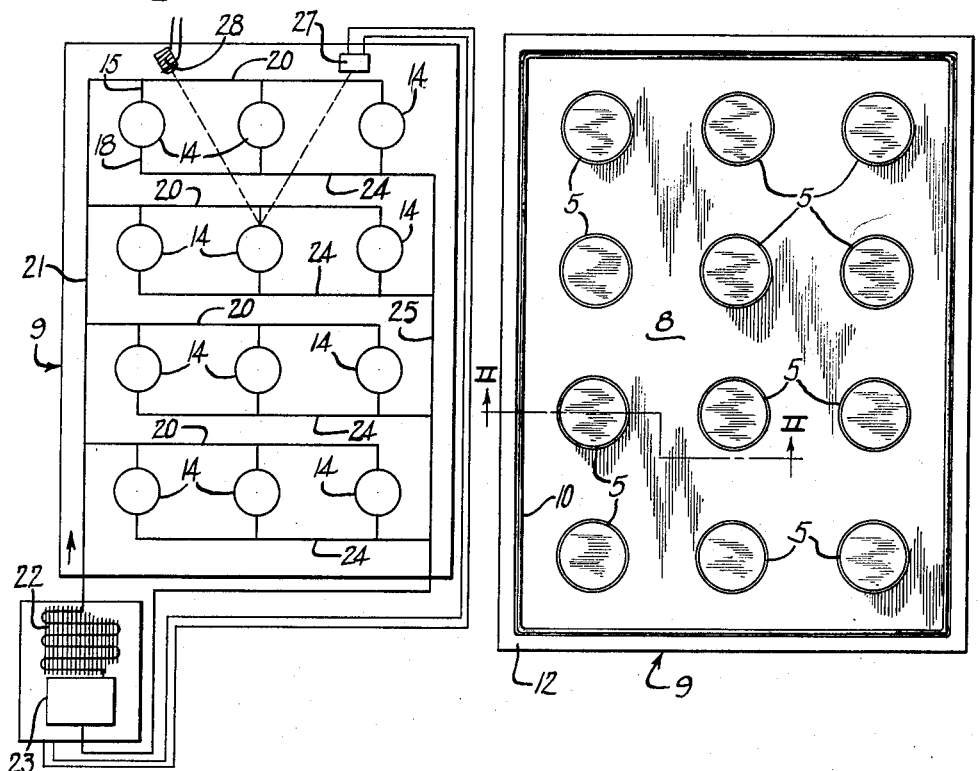
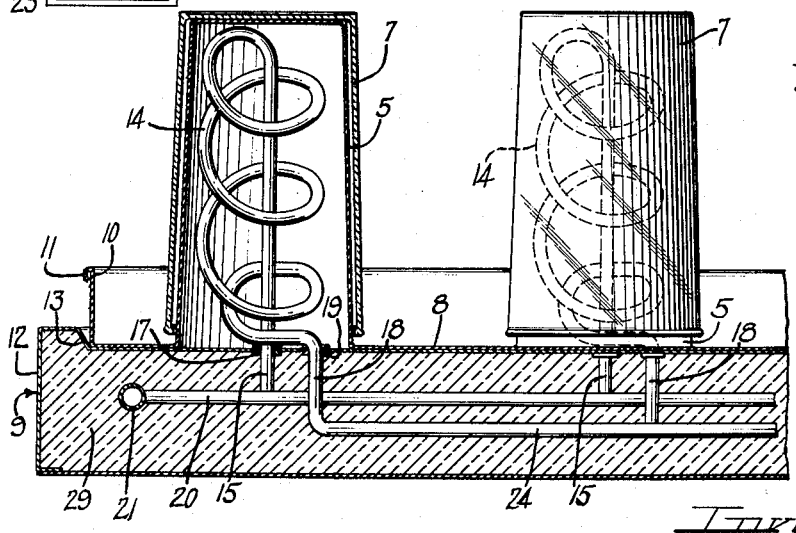
Inventor
Frederick W. McDonald

United States Patent Office

2,959,940
Patented Nov. 15, 1960

2,959,940

APPARATUS FOR INDIVIDUAL REFRIGERATION OF GLASS VESSELS

Frederick W. McDonald, Elmhurst, Ill., assignor to A & W Products Incorporated, Santa Monica, Calif., a corporation of California Filed June 19, 1957, Ser. No. 666,627

4 Claims. (Cl. 62—458)

The present invention relates to improvements in means for individually refrigerating glass vessels, and while adaptable for various types of glass vessels such as laboratory beakers, test tubes and the like, is especially suitable for individually coating the exterior of beverage glasses with heavy frost.

Pleasure incident to drinking of various beverages, of which beer, lemonade, root beer, cola drinks, wines, and cocktails are but a few examples, is enhanced for many persons by serving of the beverage in a frosted glass. Heretofore, however, it has been customary to attain this desirable end by placing the glasses inside of a refrigerated cabinet by the tray load. Serving of parties or banquets may be thus accommodated, but it is not a satisfactory way to supply frosted glasses for individual customer or drinker demands sporadically or at intermittent intervals.

It is therefore an important object of the present invention to provide novel apparatus by which drinking glasses or other types of glass vessels are adapted to be individually refrigerated to a temperature below 32° F. so that they become frosted.

Another object of the invention is to provide apparatus by which a plurality of glasses are adapted to be individually refrigerated so that even though use of the glasses may be sporadic, a continuous supply of frosted glasses is available without necessitating opening of any refrigerator cabinet or warming of the remaining or spare chilled glasses.

A principal object of this invention is to provide apparatus by which individual glasses may be externally coated with heavy frost, their insides remaining dry.

A further object of the invention is to provide apparatus for individually refrigerating glass vessels in an efficient, thorough and economical manner.

Still another object of the invention is to provide glass refrigerating apparatus which makes available immediately at hand a supply of frosted glasses which are maintained in the desired frosted state continuously until removed from the apparatus for use.

Yet another object of the invention is to provide apparatus which will serve the combined functions of a sanitary glass rack and a glass refrigeration device.

Other objects, features and advantages of the present invention will be readily apparent from the following detailed description of a preferred embodiment thereof taken in conjunction with the accompanying drawing, in which:

Figure 1 is a top plan view of apparatus for individual refrigeration of glass vessels according to the present invention;

Figure 2 is an enlarged fragmentary sectional detail view taken substantially on the line II—II of Figure 1; and Figure 3 is a schematic diagram of an exemplary refrigeration and control system for the apparatus.

An important field of usefulness for the present invention resides in the supplying of frosted beverage glasses.

For this purpose, it is desirable to have the glasses available immediately at hand for use as desired. This is accomplished herein by the provision of individual glass refrigerating units such as respective refrigerator poles or arbors 5 each receptive of a glass 7 to be frosted. In a desirable rack-like arrangement, a plurality of the refrigerator arbors 5 is provided on a common tray 8. For example, there may be twelve of the arbors 5 properly spaced to enable mounting and removal of the individual glasses 7 with facility and yet in such a compact relationship as to enable the apparatus to be conveniently supported on a utility shelf or counter in service.

In a preferred construction, the arbor tray 8 is formed as a separable component with respect to a refrigeration base 9. For sanitary reasons, it is desirable that the arbors 5 and the remainder of the tray 8 be integral and free from creviced joints, and may therefore be formed as by drawing or stamping sheet metal techniques from a single sheet or plate of sheet metal such as stainless steel, aluminum, or other suitable material that is preferably susceptible of polishing and possibly also plating to provide a polished, sanitary, easily cleaned surface. Each of the arbors 5 is preferably shaped substantially to conform to the inside dimensions of the glass 7 to be received thereon to receive the glass inverted thereupon in free sliding but preferably reasonably close heat transfer relation. The height of the arbor 5 is slightly greater than the inside longitudinal dimension of the glass so that when the glass is received on the arbor 5, the edge of the glass will be clear from the bottom of the tray 8 for sanitary and drainage purposes.

About the perimeter of the tray 8 is preferably provided an upstanding retaining and reinforcing flange 10 having its upper edge finished as by means of a turned over finishing and reinforcing flange 11. In addition, the upstanding flange or rim 10 serves to confine to any tray drainage, as well as particles of any glasses that may possibly be accidentally broken or chipped due to careless handling. Removal and replacement of the tray 8 with respect to the refrigeration base 9 is also facilitated by provision of the marginal rim flange 10 which may, if desired be provided with suitable handles (not shown).

In a compact, efficient unit, the refrigeration base component 9 of the apparatus comprises a shell 12 which may be made from metal or plastic, or other suitable material providing a deck upon which the arbor tray 8 is adapted to be freely removably seated, with suitable centering means being provided on the deck, such as a depressed or inset tray receiving area defined by a centering shoulder 13 opposing the lower portion of the tray side wall flange 10.

Interiorly of the shell 12, mechanical refrigeration system means may be accommodated for supplying individual coolant flow-conducting tubes or evaporators 14 which may be of any preferred form or shape but are shown herein as evaporator coils projecting upwardly from the base deck to be encompassed within the downwardly opening hollow evaporator or refrigeration chambers or stalls within the respective glass-receiving arbors 5. As will be observed in Fig. 2, the evaporator coils 14 are dimensioned to remain out of direct contact with the interior surfaces of the arbors 5 so as to avoid direct, possibly unbalancing heat transfer. Each of the refrigerating coils 14 has a riser tube portion 15 extending through an insulating grommet 17 in the base deck, and a return duct tube portion 18 extending through an insulating grommet 19 in the base deck.

Within the chamber provided by the base shell 12, each of the riser tube portions 15 is connected to a refrigerant supply system which may include respective branch supply ducts 20 for each of a plurality of the refrigerating coils 14 and leading from a refrigerant supply header duct 21 connected in supply relation to the liquid refrigerant supply end of a condenser 22 to which compressed refrigerant gas is supplied by a compressor 23. Spent gaseous refrigerant is conducted from each of the return duct tube portions 18 of the evaporator units to collector ducts 24 leading into a collector or accumulator return header 25 connected to the inlet of the compressor 23.

Means may be provided for controlling operation of the refrigeration unit to produce the degree of refrigeration desired. One desirable form that such control means may take comprises a light sensitive device such as an electric eye 27 located to receive light from a source such as a lamp 28 productive of a light beam aimed at one or more of the arbors 5 which for this purpose may be provided with a highly polished or reflective surface at least in the area of impingement of the light beam. As a result, as long as the light from the light beam is received by the electric eye 27, the refrigerating unit operates to actuate the compressor and thus maintain circulation of the refrigerant through the evaporating coils 14. When the light beam is broken by heavy frosting of the glass on the arbor or arbors toward which the light beam from the lamp 28 is trained as the target, the compressor 23 is halted.

In the use of the glass frosting apparatus of the present invention, the several arbors 5 may be loaded with glasses to be frosted before the tray 8 is assembled with the base 9, or the glasses may be applied to the arbors after the tray is assembled with the base, as preferred. When the tray 8 is assembled with the base and with the respective refrigerating coils 14 housed within the refrigeration chambers or stalls of arbors 5, the refrigeration unit is set into operation by reflection of a light beam to the electric eye 27 directly from the arbor or arbors 5 upon which the light source is trained or through the transparent glass or glasses on the arbor or arbors. When frost collects on the arbor from which the light is reflected, and breaks the light beam, there being no glass on the arbor, or when the glass assumes a heavenly frosted exterior and thus breaks the light beam, the refrigeration system is stopped so long as the frosty condition is present. Removal of the glass from the arbor or increasing of temperature restarts the refrigeration system.

Heat transfer or loss is primarily directly through the respective arbors 5 and the glasses supported thereon. Accordingly, rapid frosting of the glasses results.

Heat transfer through the base 9 is substantially precluded by packing the chamber therein with suitable insulation 29 within which the various refrigerant ducts inside the base are embedded in insulated relation. A bottom plate 30 may close the bottom of the chamber within the base shell 12 and retain the insulation therein.

For cleaning and arbor defrosting purposes, the tray 8 is easily and quickly removable from the base 9.

For various shapes and sizes of glasses, trays 8 which are provided with arbors 5 of the proper conformable size may be provided.

It will be understood that modifications and variations may be effected without departing from the scope of the novel concepts of the present invention.

I claim as my invention:

1. An apparatus for individually frosting the exterior of a plurality of open mouth vessels such as beverage glasses or the like, comprising in combination, mechanical refrigeration means including an insulation-filled base structure having an non-refrigerated upper surface thereon, said means also including a plurality of coolant conducting tubes projecting therefrom, tubing means supported within the insulation in said base for supplying said coolant tubes with refrigerant to refrigerate said coolant tubes to a temperature below 32° F., and a tray engageable with said non-refrigerated upper surface and provided with a plurality of hollow arbors opening through the tray and providing stalls having said coolant tubes therein and said arbors being receptive slidably thereon of vessels to be frosted.

2. An apparatus for individually frosting the exterior of open mouth vessels, including in combination, a base comprising a shell having an insulating fill and a refrigerating duct system therein connected to a refrigerant source and provided with a plurality of spaced individual refrigerating coils each projecting from said base, and a tray having a plurality of arbors thereon providing stalls within which the refrigerating coils are adapted to be individually received to refrigerate substantially only said arbors to a temperature below 32° F., said stalls being dimensioned to receive individual vessels thereover to be frosted.

3. An apparatus for individually frosting the exterior of open mouth vessels, comprising in combination, a base comprising a shell having an insulating fill and a refrigerating duct system therein connected to a refrigerant source and provided with a plurality of spaced individual refrigerating coils each projecting from said base, and a tray having a plurality of arbors thereon providing stalls within which the refrigerating coils are adapted to be individually received to refrigerate substantially only said arbors to a temperature below 32° F., said arbors being dimensioned to receive individual vessels thereover to be frosted, said base and said tray having means coactive to center the tray on the base with the refrigerating coils located in the stalls in spaced relation to the walls of the arbors defining the stalls.

4. An apparatus for frosting the exterior of individual open mouth glass vessels, comprising in combination, an arbor for receiving thereon a glass vessel, said arbor being provided with a polished surface, mechanical refrigeration means including coolant flow-conducting means, said coolant flow-conducting means being disposed in heat transfer relationship with said arbor, and means for controlling the refrigeration means to insure presence of the frost on the vessels comprising an electric eye system including a light beam trained upon the polished surface of the arbor and reflectively received by the electric eye whereby the reflected light beam energizes the electric eye and thereby controls the refrigeration means to operate, but wherein the light beam is broken when the polished surface becomes frosted or a glass vessel on the arbor becomes heavily frosted to shut-off the refrigeration means.

References Cited in the file of this patent
UNITED STATES PATENTS

| | | |
|---|---|---|
| 415,980 | Sachs | Nov. 26, 1889 |
| 1,879,317 | Klein | Sept. 27, 1932 |
| 2,297,370 | Siedle | Sept. 29, 1942 |
| 2,737,786 | Lindenberg | Mar. 13, 1956 |
| 2,759,339 | Kundert | Aug. 21, 1956 |